US008035490B2

(12) United States Patent
Hunt et al.

(10) Patent No.: US 8,035,490 B2
(45) Date of Patent: Oct. 11, 2011

(54) COMMUNICATION AND FILTERING OF EVENTS AMONG PEER CONTROLLERS IN THE SAME SPATIAL REGION OF A SENSOR NETWORK (75) Inventors: Christian L. Hunt, Cary, NC (US); Jake Palmer, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 11/567,894

(22) Filed: Dec. 7, 2006

(65) Prior Publication Data
US 2008/0136605 A1    Jun. 12, 2008

(51) Int. Cl.
G08B 13/14 (2006.01)
G08B 1/08 (2006.01)
G01R 31/08 (2006.01)
H04L 12/28 (2006.01)
G06F 15/16 (2006.01)

(52) U.S. Cl. ........... 340/286.02; 340/572.1; 340/539.22; 340/4.32; 370/235; 370/236; 370/254; 709/218; 709/221; 709/249

(58) Field of Classification Search .................. None
See application file for complete search history.

(56) References Cited

U.S. PATENT DOCUMENTS

| 5,884,072 | A | * | 3/1999 | Rasmussen ................. 709/223 |
| 6,275,957 | B1 | | 8/2001 | Novik et al. |
| 6,438,618 | B1 | | 8/2002 | Lortz et al. |
| 6,484,200 | B1 | | 11/2002 | Angal et al. |
| 6,918,124 | B1 | | 7/2005 | Novik et al. |
| 7,152,791 | B2 | * | 12/2006 | Chappidi et al. ............... 235/385 |
| 7,337,078 | B2 | * | 2/2008 | Bond et al. ..................... 702/51 |

(Continued)

FOREIGN PATENT DOCUMENTS
WO    2006068382 A1    6/2006

OTHER PUBLICATIONS

PCT Notification of Transmittal of the International Search Report and the Written Opinion of the International Searching Authority, or the Declaration dated Apr. 24, 2008.

(Continued)

*Primary Examiner* — Toan N Pham
*Assistant Examiner* — Fekadeselassie Girma
(74) *Attorney, Agent, or Firm* — Karuna Ojanen; Ojanen Law Offices (57) ABSTRACT

In a wireless tag identification and processing architecture and infrastructure, a method and system that eliminates redundant reporting and processing of the same event observed by different reader/sensors. Reader/sensors and their respective connected controllers are configured as peers when they observe or cover the same spatial region. When an event is observed within the spatial region, the first controller to receive the event data reports the electronic tag data and event data to the next higher processing domain and to its peer controllers. Then when the same electronic tag data or other event data indicating that a subsequent event is actually the same event as observed earlier is received by another peer controller, the another peer controller does not report nor process the electronic tag data and other event data to the next higher processing domain or to its peer controllers.

12 Claims, 6 Drawing Sheets

U.S. PATENT DOCUMENTS

| | | | |
|---|---|---|---|
| 7,706,369 B2 * | 4/2010 | Roese et al. | 370/389 |
| 2004/0208184 A1 * | 10/2004 | Tanaka et al. | 370/397 |
| 2005/0254712 A1 | 11/2005 | Lindeman | |
| 2006/0170565 A1 * | 8/2006 | Husak et al. | 340/825.49 |
| 2006/0208885 A1 | 9/2006 | Lin | |
| 2007/0018820 A1 * | 1/2007 | Chand et al. | 340/572.1 |

OTHER PUBLICATIONS

Chamberlain, James et al., "IBM Websphere RFID Handbook: A Solution Guide"- May 2006, IBM, USA at http:www.redbooks.ibm.com/redpieces/abstracts/sg24147.html, pp. 36-41, 45-51, 148-152, 161-162, 169, 174-178 and 213-218.

* cited by examiner

COMMUNICATION AND FILTERING OF EVENTS AMONG PEER CONTROLLERS IN THE SAME SPATIAL REGION OF A SENSOR NETWORK

BACKGROUND OF THE INVENTION

Field of the Invention

This invention relates to the field of electronic communications and more particularly relates to electronic controllers of a tagged information system being able to communicate the detection of an event within a region to other electronic controllers monitoring the same region.

Without a doubt, today our lives are impacted by pervasive, even ubiquitous electronic reader/sensors obtaining information about us and the environment and events within their purview. Electronic cameras watch us walk in and out of convenience stores, drive through intersections, detect our presence, determine the amount and price of our purchases, etc. One use of these scanners is to read electronic tags during the transport of commercial goods. The tags are actually electronic devices with an embedded semiconductor chip storing unique identification information of the object or person having the tag. The tags also have a transponder that receives and transmits electromagnetic signals such that the signals may read, write or rewrite data from/to the semiconductor chip from a remote scanner or antenna emitting the signals. Scanners and antennas are tuned to particular frequencies of the electromagnetic spectrum; some detect in the infrared (IR) range, some in the visible range, some in the ultraviolet (UV) range, some in the radio frequency (RF) range. RF radiation has the lowest frequency and the longest wavelength of the electromagnetic spectrum; moreover, the Earth's atmosphere is transparent to radio waves with wavelengths from a few millimeters to about twenty meters so RE tags are used in commercial and tracking applications. When an object or living creature having the tag comes into the range of the antenna/reader, the tag responds with a signal of its own that says, "I am here" and may then transmit its identifying information or other signal for tracking. The antenna/reader can then monitor the item or living creature while it/he/she is within the range of antenna/reader.

Figure 1:
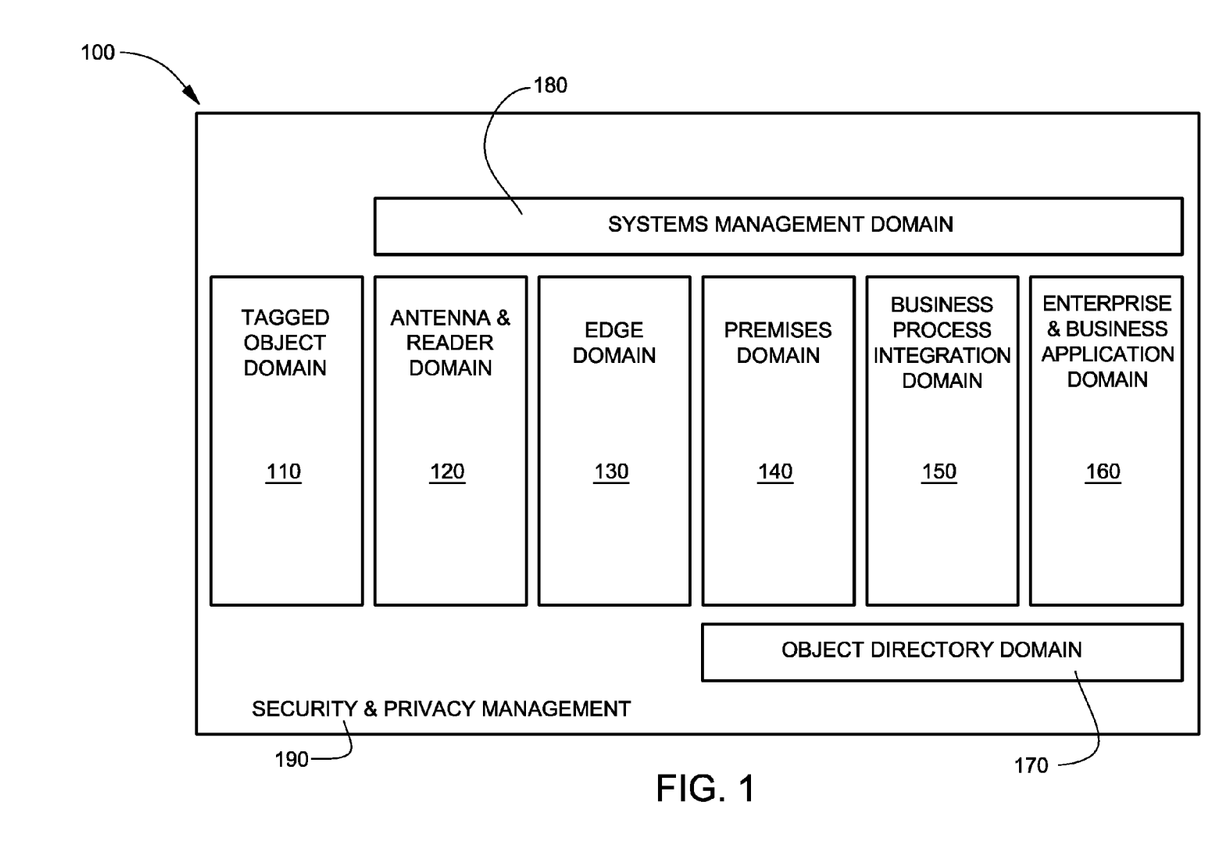
FIG. 1 is a simplified block diagram of the software architectural model to obtain and process information about events in a business environment.

In commercial applications, the tag provides identifying information about products in commerce; in these situations, the tag, reader/sensors, and processing devices or computers also called servers in a remote office, warehouse, loading dock, distribution center, etc. may be organized into domains such as shown in the simplified block diagram of FIG. 1 wherein the domains increase in complexity and processing power to the right of the diagram. The domains are actually software domains of information and processing beginning with the tag domain 110 and ending with the enterprise server 160. In between are the antenna and reader domain 120, the edge domain 130, the premises domain 140, the business process integration domain 150, and finally the enterprise and business application domain 160. The systems management domain 180 comprises the antenna and reader/sensor/reader domain 120, the edge domain 130, the premises domain 140, the business process integration domain 150, the enterprise and business application domain 160, and the object directory domain 170.

The tag domain 110 contains the tagged products in a supply chain or any other assets or locations that are intended to be tracked or monitored, including the use of reader/sensors on tags. Object and tag are physically attached so they are considered to be in the same domain. This domain also includes all those components that are required to get the tag on the object, i.e., silicon, labels etc. Decisions for a specific tag type, i.e., determining if the tag should be passive, active, semi-active, depend very much on the characteristics of the physical object on which they are tagged, e.g., tagged pallet, food with a temperature reader/sensor, the accuracy desired, etc. In contrast to other domains, most of the objects in the tag domain 110 are mobile meaning that the objects may move across different spatial regions.

The antenna and reader domain 120 is the interface between the world of physics, i.e., the objects, tags, radio frequencies, etc., and the world of information technology (IT). The antenna and reader domain 120 may include various technologies and frequencies, such as UHF, 13.56 megahertz contactless smart technology, barcodes, gate and/or pallet readers, and can also include writers, printers, reader/sensors on readers, stand-alone reader/sensors and actuators. Antennas and readers are dependent upon each other and must be compatible; ideally they are purchased from the same provider. Actually, however, numerous providers are used in a given customer environment so some integration between different antenna and reader packages is often required.

The edge domain 130 includes the functionality of filtering and aggregating volumes of data provided by the readers, supporting the analysis of data and applying local decision making and intelligence. A very important point to make here is that the definition of the word "edge" as used in the context of software service providers, developers, and this patent, refers to the last piece of executable code closest to the events. The architecture of the edge domain 130 needs to be compatible with readers from multiple vendors and must effectively hide individual reader and tag idiosyncrasies from the rest of the infrastructure. The edge domain 130 is typically a low cost hardware appliance just upstream of the readers and uses pervasive technology to establish a software stack on the lower edge of the business operations infrastructure. One edge appliance can control multiple readers. The edge domain 130 provides assured message delivery into the premises domain 140, as well as automatic reader discovery and authentication. Even with the reader/sensors being incorporated with devices in the edge domain 130, the edge domain 130 now has multiple instances of the same event. Because all unnecessary communication up to the premises domain 140 involves network usage and processing power, duplicate processing of the same event in the edge domain 130 decreases performance of the entire infrastructure.

The premises domain 140 is the intermediary between enterprise applications 160 and the edge domain 130. The premises domain 140 filters and aggregates, monitors and escalates tag identification events to detect critical business operations, or tracks the location of physical objects. It also logs all important information on products and locations and manages "downstream" components in other domains, such as readers or edge appliances. The premises domain 140 deals with events that are important in context of a business operation or process, which are typically on a "higher" level than those in the edge domain 130. The premises domain 140 stores data and interacts with enterprise systems through business process integration 150. The premises domain 140 is typically hierarchical in the sense that a head office coordinates subordinate premises although there may be business logic specific to a particular premise. As an example, a distribution center for food may have different business logic than a distribution center for hardware although they belong to the same retail chain and are part of the same hierarchy.

The business process integration domain 150 connects the tag identification infrastructure to enterprise applications 160. While other domains provide a reasonable level of functionality "out-of-the-box," business process integration requires customization to optimize a given enterprise environment. The business process integration domain 150 can therefore be described as a toolbox for business integration. A key feature of the business process integration domain 150 is its ability to act as a business-to-business hub for automatic transactions between trading partners. As the rest of the tag identification infrastructure notices significant product movement such as a large shipment, this domain 150 can format and send a message, e.g., an Advanced Ship Notice, to the appropriate trading partner.

The enterprise and business application domain 160 contains the existing "backend" applications that require information about product movement that will be captured by the tag identification infrastructure. These applications correspond to an organization's unique mix of business support requirements. The enterprise and business application domain 160 includes systems to order, manage, or supply goods that are facilitated by being able to automatically monitor product movement. Examples are process automation, inventory management, manufacturing execution systems, supply chain execution systems, warehouse management systems, data warehouse, merchandise management, store systems, work-in-progress manufacturing, etc.

The object directory domain 170 provides information about the physical object using its unique ID as the lookup key. The object directory domain 170 enables the rapid retrieval of product information and also provides a framework for allowing companies to securely share product information with trading partners, etc. The object directory domain 170 delivers three kinds of information on a product: (a) core product information of all items of this stock keeping unit (SKU); (b) manufacturing time information such as lot number, and other information relating to the time of manufacture; life cycle history information of events captured throughout the lifetime of this item.

The systems management domain 180 are those capabilities to get the entire hierarchical tag identification infrastructure and corresponding systems up and then keep them running. The systems management domain 180 remotely deploys and manages applications in this distributed environment, including the ability to remotely monitor, configure, or update software and firmware in deployed assets such as antennas, readers, and servers. The systems management domain 180 may have a central "dashboard" through which it is possible to monitor assets and receive alerts when readers, antennas, and servers malfunction to increase reliability and reduce operations costs. This domain 180 can also deliver operator and user consoles when remote guidance is required.

As the tag identification infrastructure becomes an integral part of an enterprise-wide data management system, IT systems must be resistant to security and privacy breaches. Effective security and privacy management 190 allows customers to extend their existing security infrastructure to the reader level through to the Electronic Product Code (EPC) Network, an open-loop, standards-based environment for the global exchange of product information. The security and privacy management 190 must protect stored data and data in transit. Comprehensive management procedures include implementing and utilizing enterprise-wide security and privacy policies. Devices in the tag domain 110 and the antenna and reader domain 120 and other devices that are part of a secured network must undergo an ongoing process of device authentication to prevent "reader spoofing", i.e., unplugging a reader and plugging in a laptop to create a false data stream meant to look like it comes from an authenticated reader. The object directory domain 170 is subject to user authentication, authorization, and data encryption practices in accordance with a security and privacy management policy. Transmitted data must be sent with integrity and confidentiality controls to allow for detection of tampering, and to prevent eavesdropping.

The information below is derived from "IBM WebSphere RFID Handbook: A Solution Guide" at http://www.redbooks.ibm.com/redpieces/abstracts/sg247147.html, herein incorporated by reference in its entirety. Thus, the discussion above makes it apparent that tag data is critical in business applications involving identification. When the tag data is not processed properly, the errors are propagated upstream to the premises domain which can cause network overload. The antenna/readers are connected or in wireless communication with other antenna/readers that may cover the same or a different range. All antenna/readers interrogate all the tags in their range when the antenna/readers are in READ mode. The antenna/readers, moreover, are in a network with a server or other processing devices to monitor changes in the environment or inventory or other details associated with the item or living creature having the tag.

It is not unusual for a tag to be within the range of more than one antenna/reader, such as on a loading dock or a conveyor belt, etc. In fact, many systems designed to monitor events within a physical space have multiple antenna/readers monitoring overlapping regions in the antenna and reader domain 130. There are several reasons and advantages of using multiple antenna/readers with overlapping ranges: (a) improved reliability for witnessing the event; (b) more events can be witnessed in less time; (c) increased antenna/reader coverage costs less than the cost of missing events; and (d) there are multiple opportunities to witness an event as the event moves in space, e.g., for example, an item moving along a conveyor belt or down a hallway can be tracked by antenna/readers along the way to ensure at least one antenna/reader sees the event.

It is common and necessary to distribute the workload of the systems management domain 180 between domains or systems of varying capability. For example, reader manufacturers in the antenna and reader domain 120 have developed smart readers having local processing capability and network access to and from the enterprise and business application domain 160. Trade-offs of storage and processing power as well as network traffic are always considered when determining whether a particular task will be accomplished in a particular domain. The edge domain 130 receives information from the antenna and reader domain 120. The prior art tiered architecture of FIG. 1 is ideal when only one antenna/reader detects one event and transmits that information to only one appliance in the edge domain so that no events reach multiple edge appliances. But in actuality, antenna/readers report the tags as they find them and this results in duplicate data from multiple antenna/readers transmitting to multiple edge appliances. There is no communication between multiple edge appliances in the edge domain.

There is thus a need to improve efficiency and enhance the performance of the tag identification and processing system. These needs and other that will become apparent are solved by the invention as presented below.

SUMMARY OF THE INVENTION

The inventors herein present a method of establishing peer edge controllers in a spatial region of a sensor network, whereby each of a plurality of reader/sensors in a spatial region of the sensor network are connected to a respective one of a plurality of controllers; a spatial region is assigned to the plurality of controllers thereby making them peer controllers, each of the plurality of controllers is informed of every other of the plurality of controllers in the spatial region; and communication is initialized among the plurality of controllers. Communication may be initialized by establishing a peer-to-peer connection between each of the plurality of controllers; or through a broker and each of the plurality of controllers subscribes to the broker, and a subscription topic to which the plurality of controllers are subscribed is the address of the plurality of controllers in the spatial region.

The method of establishing peer controllers in a spatial region of a sensor network further comprises reporting an event in the spatial region, wherein the steps of reporting an event further comprises one of the plurality of reader/sensors observing an event in the spatial region; the observant reader/sensor transmitting tag data and data of the event to its respective controller; the respective controller determining that the event is a new event; and the respective controller reporting the tag data and the new event data to a higher processing domain, and informing the peer controllers of the new event, which in turn add the new event data to their respective list of preexisting events.

The method of establishing peer controllers in a spatial region of a sensor network further comprises determining that an observed event has been reported wherein one of the plurality of reader/sensors observes an event in the spatial region; the observant reader/sensor transmits data of the event to its respective controller; the respective controller determines that the event is in a list of preexisting events; and the respective controller does not report the event to a higher processing domain.

The invention may further be considered a computer program product in a computer-readable medium comprising a computer usable medium having computer usable program code, wherein the computer usable program code, when loaded into the internal memory of a processing device, causes the processing device to assign a spatial region in a sensor network to a plurality of controllers, each of the controllers having a connected reader/sensor that observes the spatial region; inform each of the plurality of controllers of every other of the plurality of controllers in the spatial region; and initialize communication among the plurality of controllers. The computer usable program code, when loaded into the internal memory of a processing device, may cause each of the plurality of controllers to receive tag data and event data from its respective reader/sensor of an event occurring in the spatial region; determine that the event is a new event; report the tag data and event data to a higher processing domain; report at least the event data to all other of the plurality of controller in the spatial region; and add the event data to its list of preexisting events. Each of the plurality of controllers may determine if an observed event has been reported to a higher processing domain by receiving tag data and event data from its respective reader/sensor of an event occurring in the spatial region and determining that at least the tag data or event data is in a list of preexisting events so the controller will not report the tag data or event data to a higher processing domain, nor will it report the tag data or event data to any other of the plurality of controllers.

The invention is also a tag identification infrastructure and architecture incorporated into a sensor network, comprising a reader/sensor domain having a plurality of reader/sensors capable of observing an event and acquire electronic tag data of the event in one of a plurality of spatial regions comprising the sensor network; a controller domain having a plurality of controllers, each of the plurality of controllers connected to a respective one of the reader/sensors in the reader/sensor domain and to receive and process the electronic tag data and event data, all of the plurality of controllers in each respective one of the spatial regions configured as peer controllers; a premises domain having a premises server to receive and process data processed by and from the controller domain; at least one integration server comprising a business process integration domain, a business application domain, and an object directly domain, all architected to receive and process data from the premises domain, whereby a respective one of the plurality of controllers in the controller domain receives and processes the electronic tag and event data of the event from its connected reader/sensor, reports the electronic tag and event data to the premises domain; reports at least the event data to its respective peer controllers and further wherein the respective peer controllers do not report the electronic tag and event data of subsequent occurrences of the same event to the premises domain. The premises server may further comprises an information broker and the peer controllers are subscribers to a plurality of topics on the premises server, the topics comprising the electronic tag data and event data of events occurring the spatial region, and identification of other peer controllers in the spatial region.

The invention is also a service contract for processing electronic tag data, the service contract comprising configuring each of a plurality of controllers and each respective one of a plurality of reader/sensors connected to each of the plurality of controllers as a spatial region, the plurality of controllers in a same spatial region configured as peer controllers; one of the plurality of reader/sensors transmitting electronic tag data associated with an event in the spatial region to its respective one of the plurality of controllers; determining if the electronic tag data had been received by another one of the plurality of controllers earlier; if not, processing the electronic tag data in the respective one of the plurality of controllers connected to the reader/sensor transmitting the electronic tag data, and reporting the processed electronic tag data and data of the event to a higher processing domain, and reporting the processed electronic tag data and data of the event to other peer controllers. If, however, the electronic tag data had been received by another one of the plurality of controllers earlier; then the controllers will not report the processed electronic tag data and data of the event to a higher processing domain; nor will they report the processed electronic tag data and data of the event to other peer controllers.

DETAILED DESCRIPTION OF THE INVENTION

The invention is described with reference to the accompanying drawings; however, the invention may be embodied in many different forms and should not be construed as limited to the embodiments set forth herein. Rather the illustrated embodiments are provided so that this disclosure is thorough and complete, and fully conveys the scope of the invention to those skilled in the art. Like numbers refer to like elements throughout.

As will be appreciated by one of skill in the art, the present invention may be embodied as a method, a data processing system, a computer program product and a service to provide for peer-to-peer controller communication to filter multiple readings of the same event, and thereby avoid multiple processing of the same event by multiple controllers. Accordingly, the present invention may take the form of an entirely hardware embodiment, an entirely software embodiment, or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program source code for peer-to-peer controller communication to filter multiple readings of the same event in accordance with a preferred mode described herein may be written in a programming language such as C, COBOL, FORTRAN, LISP, JAVA, SMALLTALK or C++. Object code of the peer-to-peer controller communication to filter multiple readings of the same event may execute entirely or partly on a peer controller or on a premises server or an integration server. When the program source code is located and executing on the premises or the integration server, the peer controller may be connected to the other servers through any network, such as a local area network (LAN) or a wide area network (WAN), or the connection may be made via the Internet using an Internet Service Provider.

The peer-to-peer controller communication to filter multiple readings of the same event is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions for the peer-to-peer controller communication to filter multiple readings of a single event may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
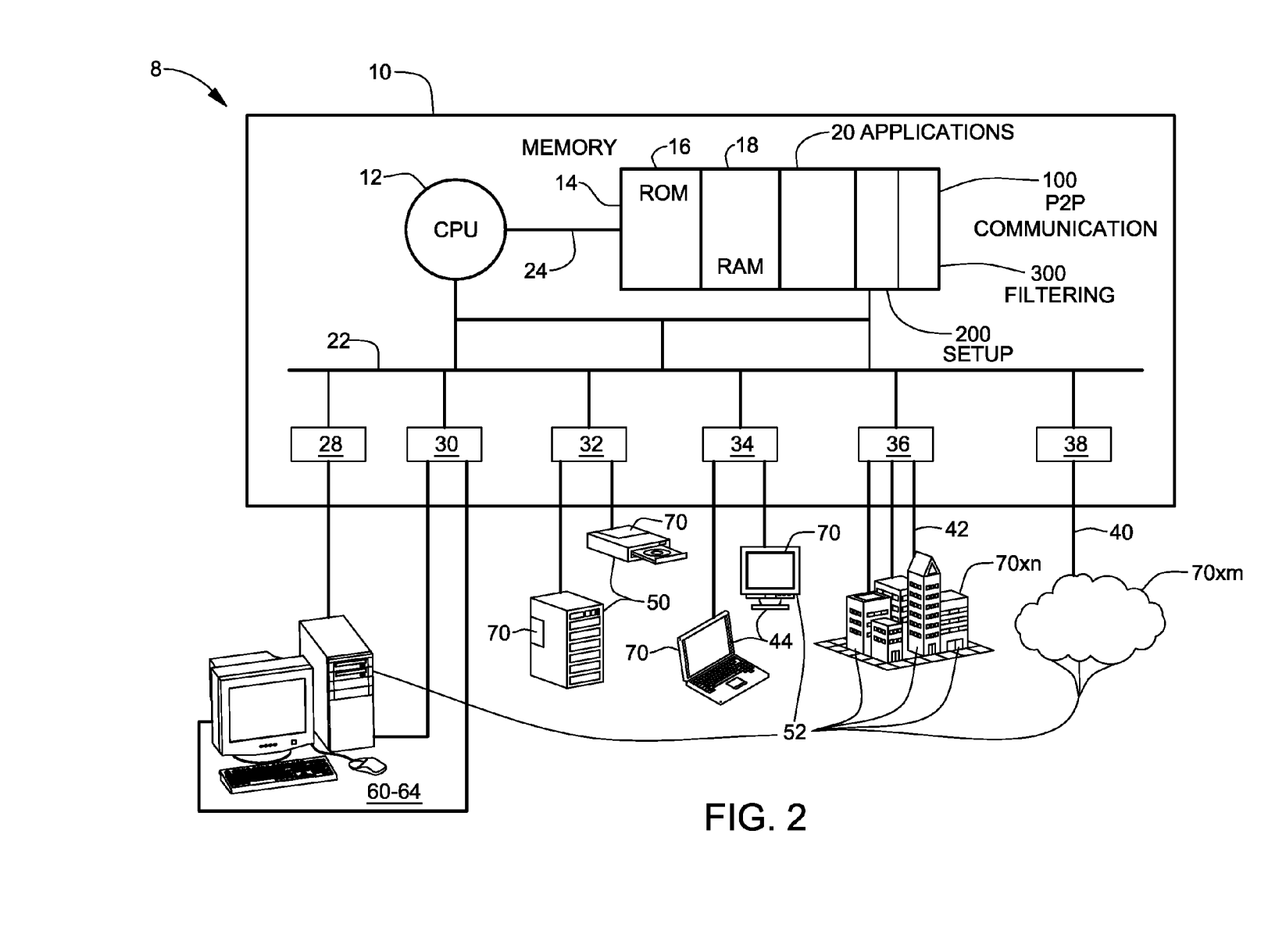
FIG. 2 is a simplified block diagram of a data processing network and machine capable of implementing peer-to-peer communication of controllers in the same spatial region in accordance with an embodiment of the invention.

Referring to FIG. 2, a high-level block diagram of a computer network system 8 consistent with an embodiment of the invention as a tag identification and business enterprise infrastructure is shown. Computer network system 8 preferably comprises a number of secure networked computers 10, each of which may have a central processing unit (CPU) 12, memory 14, and various digital and/or analog interfaces 28-38. The various devices communicate with each other via an internal communications bus 22. CPU 12 is a general-purpose programmable processor, executing instructions stored in memory 14; while a single CPU is shown in FIG. 1, it should be understood that computer systems or servers having multiple CPUs could be used. CPU 12 is capable of executing an operating system 20 and the peer-to-peer communication and processing among controllers 100 and other applications. CPU 12 is also capable of generating the computer program or the instructions embodying the peer-to-peer controller communication to filter multiple readings of the same event 100, is capable of receiving and transmitting the program instructions embodying the peer-to-peer controller communication to filter multiple readings of the same event 100, and is capable of storing data generated by the peer-to-peer controller communication to filter multiple readings of the same event 100 described herein. It is worth repeating that CPU 12 is also capable of performing the peer-to-peer communication and processing among the controllers. Communications bus 22 supports transfer of data, commands and other information between different devices, and while shown in simplified form as a single bus, it is typically structured as multiple buses including an internal bus 24 which may connect the CPU 12 directly with memory 14.

Memory 14 comprises a read only memory (ROM) 16 and a random-access memory (RAM) 18 for storing the operating system 20, the peer-to-peer controller communication to filter multiple readings of the same event 100, and other data and programs. Typically, those portions or programs, routines, modules of the operating system 20 necessary to "boot up" are stored in ROM 16. RAM 18 typically stores programs and data that will be erased when the computer turns off. Memory 14 is shown conceptually as a single monolithic entity but it is well known that memory is often arranged in a hierarchy of caches and other memory devices, some or all of which may be integrated into the same semiconductor substrate as the CPU 12. RAM 18 devices comprises the main storage of computer, as well as any supplemental levels of memory, e.g., cache memories, nonvolatile or backup memories, programmable or flash memories, other read-only memories, etc. In addition, memory 14 may be considered to include memory storage physically located elsewhere in computer, e.g., a cache memory in a processor or other storage capacity used as a virtual memory, e.g., as stored on a mass storage device 50 or on another computer coupled to computer via network.

Operating system 20 and the program instructions to implement the peer-to-peer communication and processing amongst the controllers 100 and other applications reside in memory 14. Operating system 20 provides, inter alia, functions such as device interfaces, management of memory pages, management of multiple tasks, etc. as is known in the art. Examples of such operating systems may include LINUX, AIX, UNIX, Windows-based, Z/OS, V/OS, OS/400, an RTOS, a handheld operating system, etc. These operating systems 20 and other various routines of the peer-to-peer controller communication to filter multiple readings of the same event 100, and other applications, components, programs, objects, modules, etc. may also execute on one or more processors in another computer coupled to computer 10 via a network 40, 42, e.g., in a distributed or client-server computing environment, whereby the processing required to implement the functions of a computer program may be allocated to multiple computers, also called servers, 10 over a network 40, 42.

In general, the peer-to-peer controller communication to filter multiple readings of the same event 100 executes within the CPU 12 to implement the embodiments of the invention, whether implemented as part of an operating system or a specific application, component, program, object, module or sequence of instructions may be referred to herein as computer programs or simply programs. The peer-to-peer controller communication to filter multiple readings of the same event 100 typically comprise one or more instructions that are resident at various times in various memory and storage in a device and that, when read and executed by one or more processors in the processing device 10, cause that device 10 to perform the steps necessary to execute steps or elements embodying the various aspects of the invention. The peer-to-peer controller communication to filter multiple readings of the same event 100 comprises a setup module or routine 200 that assigns a spatial region to a particular reader/sensor or a particular reader/sensor/controller. This setup routine 200 is accomplished with user or application program interfaces and is stored on a premises server or higher-tiered server. A filtering module 300 detects events and then performs the filtering based on the parameters and the spatial region. In the preferred embodiment, the filtering module 300 is installed on the controllers although it may be installed and executing on servers or other processing devices in a higher domain.

It should be appreciated that computer 10 typically includes suitable analog and/or digital interfaces 28-38 between CPU 12 and the attached components as is known in the art. For instance, computer 10 typically receives a number of inputs and outputs for communicating information externally. For interface with a software developer or operator, computer 10 typically includes one or more software developer input devices 60-64, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 10, e.g., some server implementations, might not support direct software developer input and output. Terminal interface 34 may support the attachment of single or multiple terminals 44 and may be implemented as one or multiple electronic circuit cards or other units. Data storage 50 preferably comprises one or more rotating magnetic hard disk drive units, although other types of data storage, including a tape or optical driver, could be used. For additional storage, computer 10 may also include one or more mass storage devices 50, e.g., a floppy or other removable disk drive, a hard disk drive, a direct access storage device (DASD), an optical drive e.g., a compact disk (CD) drive, a digital versatile disk (DVD) drive, etc., and/or a tape drive, among others. Data 52 created by or transmitted by the peer-to-peer controller communication to filter multiple readings of the same event 100 may be stored on these mass storage devices of different computers 10 that are located through the internet 40, a WAN 42, and other connected machines 42. One of skill in the art will further anticipate that the interfaces 28-38 may also be wireless, certainly at least one of the interfaces may include an RF, UHF, 13.56 megahertz contactless smart technology, barcode, gate and/or pallet readers transmitter and receiver. The peer-to-peer controllers 70 and their respective reader/sensors may be distributed throughout many spatial regions and connected to a premises server, such as computer 10, through networks 40, 42 and other interfaces.

Furthermore, computer 10 may include an interface 36, 38 with one or more networks 40, 42 to permit the communication of information with other computers 10 coupled to the network(s) 40, 42. Network interface(s) 36, 38 provides a physical and/or wireless connection for transmission of data to and from a network(s) 40, 42. Network(s) 40, 42 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 8 may be connected to more than one network 40, 42 simultaneously. Computer system and remote systems 8 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through network(s) 40, 42. Still yet, any of the components of the method and program products shown in the embodiments of FIG. 2 through FIG. 6 could be deployed, managed, serviced by a service provider who offers to perform one or more of: the setup module 200, the filtering module 300 or other process steps that the peer-to-peer controller communication to filter multiple readings of the same event 100 can perform.

In the context herein, a memory location is preferably a nonvolatile or backup memories or a programmable or flash memories, read-only memories, etc., in a device physically located on a different computer, client, server, or other hardware memory device, such as a mass storage device or on another computer coupled to computer via network. Memory location preferably comprises remote archival memory such as one or more rotating magnetic hard disk drive units, a tape or optical driver. Memory location may also be considered one or more mass storage devices, such as a floppy or other removable disk drive, a hard disk drive, a direct access storage device (DASD), an optical drive e.g., a compact disk (CD) drive, a digital versatile disk (DVD) drive, etc., and/or a tape drive, among others.

Figure 3:
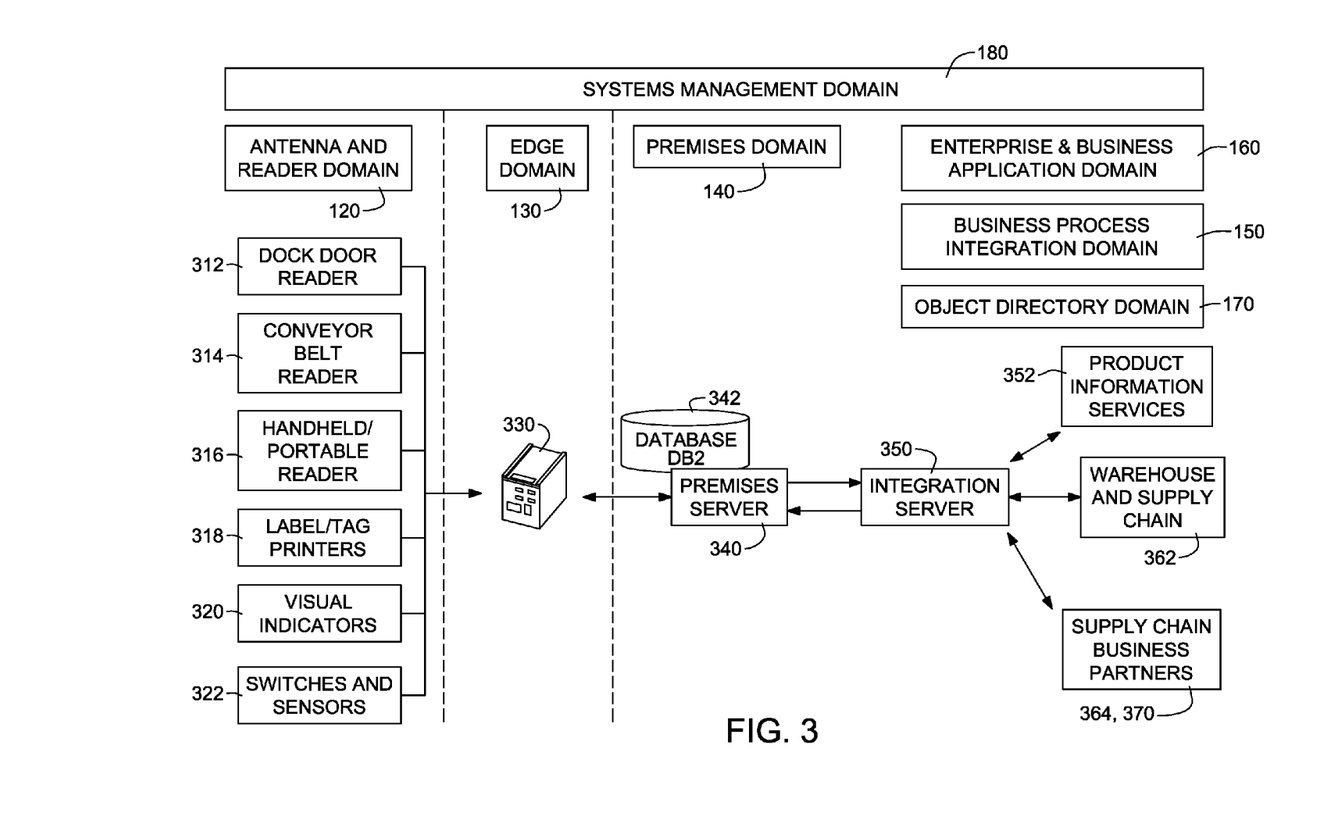
FIG. 3 is a simplified block diagram having more detail of the software architectural model to obtain and process information about events in a tag identification and tracking infrastructure in a business environment in accordance with an embodiment of the invention.

A tag identification and tracking and business enterprise infrastructure and architecture, and specifically the systems management domain 180, able to take advantage of various embodiments of the invention herein is shown in FIG. 3. The systems management domain 180 comprises the antenna and reader domain 120, the edge domain 130, the premises domain 140, the business process integration domain 150, the enterprise and business application domain 160 and the object directory domain 170. The antenna and reader/sensor domain 120 refers to those devices that respond directly to the tags. The antenna and reader/sensor domain 120 may comprise stationary, handheld, or mobile devices that may emit an electromagnetic frequency, preferably RF, to which the transponder in the tags respond and then emit an RF signal in return to be detected by the antenna and reader/sensor. Shown in FIG. 3, are examples of readers in the antenna and reader/sensor domain which may include a dock door reader 312, a conveyor belt reader 314, a handheld or portable reader 316, a label/tag printer 318, visual indicators 320, and other switches and reader/sensors 322. The antenna and reader/sensor domain 120 may be programmed to filter the data from multiple readers/sensors and allow data from only unique tags to pass to the premises domain 140. One example of filtering is the same tag filtering wherein the same tag that is read multiple times in the edge domain 130 within a short time interval may be considered to be the same tag previously read and thus filtered, such as described herein. This kind of filter improves the efficiency of the tag identification and infrastructure by sending only unique and desired events to the next higher domain, i.e., the premises domain, thereby reducing unnecessary network traffic, decreasing the delays of reaching the next higher domain, and further eliminating duplicate processing of the same events on the premises or next higher level server. Configurable filters are implemented to ensure the propagation of data required by the upstream processes and elimination of redundant data to minimize network traffic and reduce network infrastructure costs.

As events are detected at the edge domain 130, each edge controller 330, also referred to as 70 in FIG. 2, performs duplicate filtering and event aggregation, before passing the aggregate events up to the next level—the premises domain 140. Reader/sensors in the antenna and reader domain 120 typically only observe and report an event; there is no software processing or evaluation of the event. Information of the event and any tag identification is simply forwarded to the edge domain 130 where initial processing of the event would occur. Increasingly, however, the reader/sensors that witness the events are within the edge domain 130 rather than the antenna and reader/sensor domain 120 merging the two domains; thus, now there are reader/sensor/controllers. Thus reader/sensors/controllers are "smarter" and host the processing of the edge domain 130 in a single piece of hardware—the edge controller 330. In the prior art, without the benefits of the invention described herein, the same event would be detected and processed by many reader/sensor/controllers but in tag identification using tag identification infrastructure tracking only a single event need be passed to the premises domain 140. The edge controller 330 performs its own local same tag filtering and aggregation before passing the events to the premises domain 140.

The premises domain 140 of the tag identification and tracking infrastructure may comprise a premises server 340, such as computer 10 in FIG. 2, and a database 342. The database 342 may be integrated onto the premises server 340 or the database 342 may be on its own server or memory device connected to the premises server 340 via a wired or wireless connection. The premises server(s) 340 in the premises domain is then connected to the higher domains, the business process integration domain 150, the enterprise and business application domain 160 and the object directory domain 170. Within these domains 150, 160, 170 is at least one integration server 350, which may also be configured as a computer 10 of FIG. 2, having installed and executing software or applications specifically for, inter alia, product information services 352 and warehouse and supply chain management 362. There may be direct supply chain business partner communication software 364 installed and executing on the at least one integration server 350 to third party businesses 370 who provide parts or products for the enterprises.

Thus, information about the products moving in commerce arises from the antenna and reader domain 120 and is transmitted to the edge domain 130 which begins business software processing of this movement of products and goods in the antenna and reader domain 120. This processed business information from the edge domain 130 is then transmitted to one or more premises domains 140 having its respective premises server 340, preferably connected to a database 342. Business processing at the level of the premises domain 140 is then sent to the higher domains which may be implemented on one or more integration servers 350 executing software on the product information 352, warehouse and supply chain management 362, and supply chain business partners 364, 370—all part of the business process integration domain 150, the enterprise and business application domain 160, and the object directory domain 170.

Figure 4:
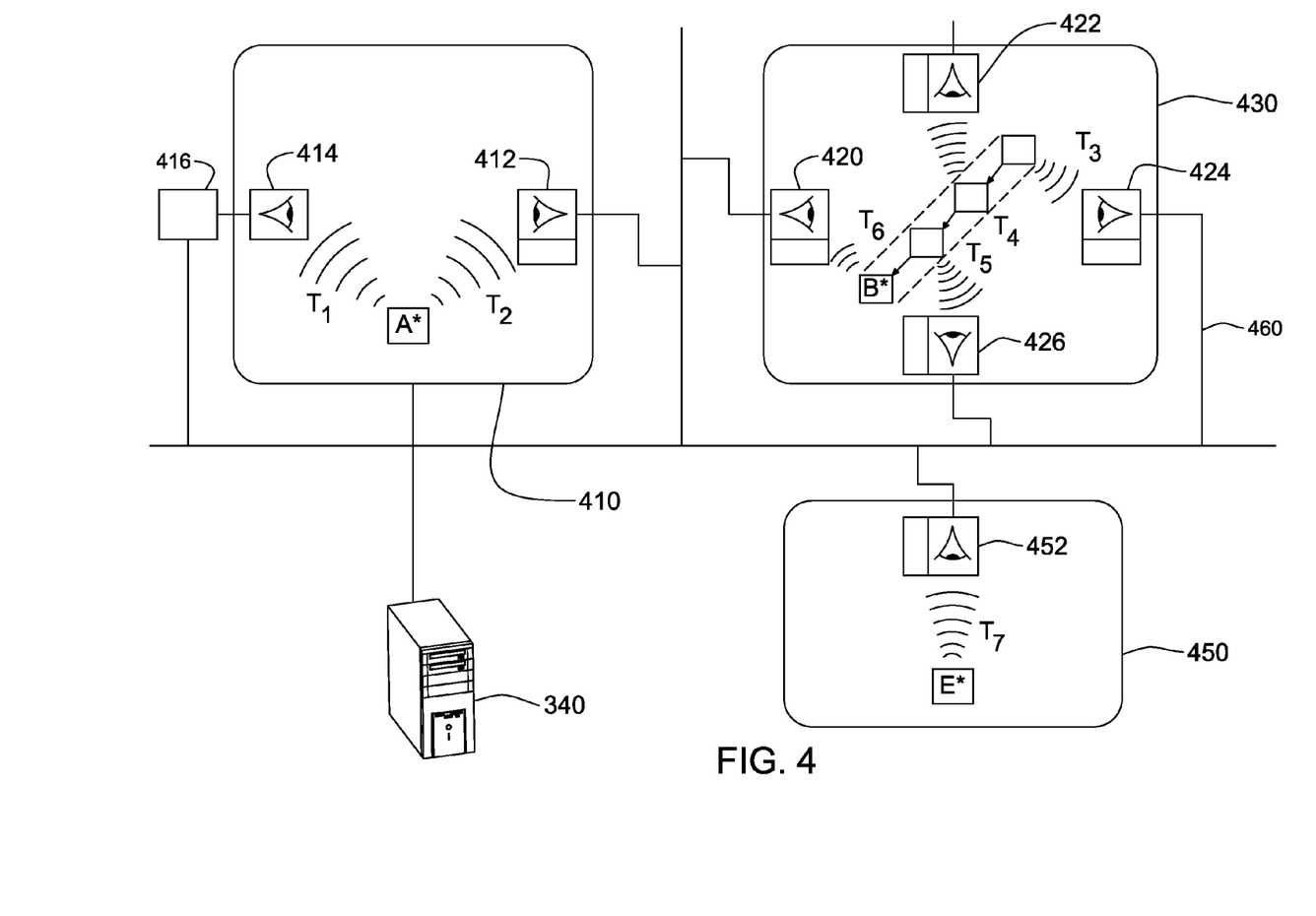
FIG. 4 is a graphical representation of the spatial regions and the reader/sensors and controllers monitoring the spatial regions to demonstrate the duplicate monitoring of an event to be remedied in accordance with an embodiment of the invention.

FIG. 4 is a simplified block diagram of how different controllers can receive and process the same event that may be in a spatial region assigned to more than one reader/sensor or reader/sensor/controller. Three spatial regions are shown in FIG. 4. Spatial region 410 has one reader/sensor/controller 412 and a reader/sensor 414 connected to a controller 416. Because both reader/sensor/controller 412 and controller 416 are within the same spatial region, they are "peer" controllers. "Peer" controllers can communicate directly to each other or can subscribe to the same topic on a subscriber/broker communication network. Reader/sensor/controllers 420, 422, 424, 426 are within spatial region 430 and so are peer controllers. Spatial region 450 has one reader/sensor/controller 452 and is peerless. Events are indicated by a letter followed by an asterisk*. Spatial region 410 has one unique event A*. Spatial region 430 has one unique event B*; spatial region 450 has one unique event E*. All the controllers are connected on a bidirectional bus 460 to each other and to the next software domain, a premises server 340 or beyond.

The reporting of the events of FIG. 4 as contemplated by the method, data processing system, computer program product and service that provide peer-to-peer controller communication to filter multiple readings of the same event will now be described. In spatial region 410, at time T1, reader/sensor 414 "sees" or detects, as indicated by arcs, event A* and communicates this event to controller 416. In accordance with a feature of the invention, controller 416 communicates with other peer controllers in its spatial region, in this case, controller 416 directly communicates to reader/sensor/controller 412 that it has seen event A*. Controller 416 also processes and reports event A* to premises server 340. At time T2, reader/sensor/controller 412 sees or detects event A* but does not report it any further because its peer controller 416 has already seen or detected the same event. Reader/sensor/controller 412 may, however, store the event in its own local memory but does not report the event to the next higher domain 340.

In spatial region 430, there are four peer reader/sensor/controllers 420, 422, 424 and 426. At time T3, event B* is seen by reader/sensor/controller 424 who reports the event B* to its peer reader/sensor/controllers 420, 422, and 426 and to premises server 340. At time T4, event B* is seen by peer reader/sensor/controller 422 which notes that peer reader/sensor/controller 422 has already seen and reported the event B*. At time T5, event B* is seen by peer reader/sensor/controller 426 who also confirms that peer reader/sensor/controller 424 has already seen and reported the event, so it need not duplicate the report to the premises server 340. At time T6, event B* is detected by peer reader/sensor/controller 420 who also verifies that peer reader/sensor/controller 424 has already seen and reported the event, so it need not report the event B* to the premises server 340 nor to its peer controllers 422, 424, and 426. Similarly, each of these reader/sensor/controllers 420, 422, and 426 may store the event in its respective local memory but they do not report the event to the next higher domain.

At time T7, event E* occurs in spatial region 450. This event is monitored and reported by lone reader/sensor/controller 452. There are no other peer reader/sensor/controllers in spatial region 450 so it communicates the event only to the premises server 340.

Figure 5:
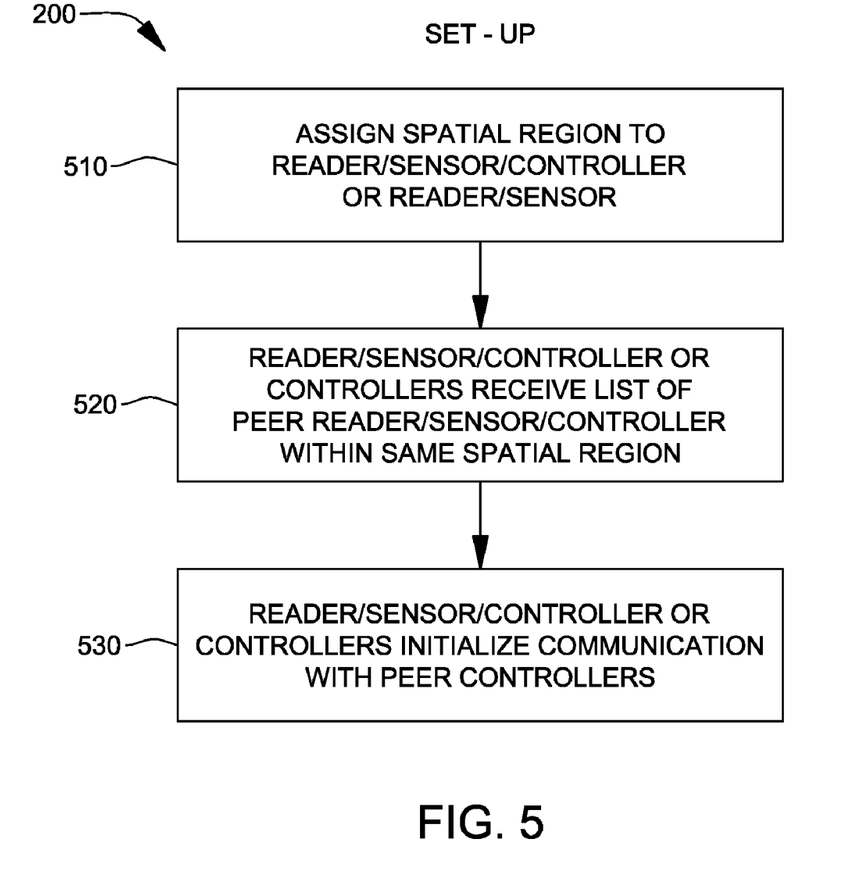
FIG. 5 is a simplified flow chart of how to set up the peer-to-peer controller communication to filter multiple readings of an event by controllers covering the same spatial region in accordance with an embodiment of the invention.

FIG. 5 is a simple flow chart of the setup module 200 of the preferred embodiment of a method, a program product, a system, and a service for peer-to-peer communication and processing amongst the controllers 100. In step 510, an administrator at the level of the premises server assigns one or more controllers to represent a particular spatial region for purposes of software processing, i.e., the administrator sets up which controllers and reader/sensor/controllers are peers. In the event that a reader/sensor is not integrated with a controller, as in reader/sensor 414 in FIG. 4, the premises server or higher level processing device also assigns the reader/sensor 414 to a controller 416. In step 520, the premises server transmits the addresses of the peer controllers of the assigned spatial region to every other peer controller of that spatial region. In step 530, the peer controllers initialize communication with each other. They may communicate directly with each other or in an alternative embodiment, the address of the peer controllers or a unique identifier for the respective spatial region may be added as a topic to an information broker to which all the peer controllers subscribe.

Figure 6:
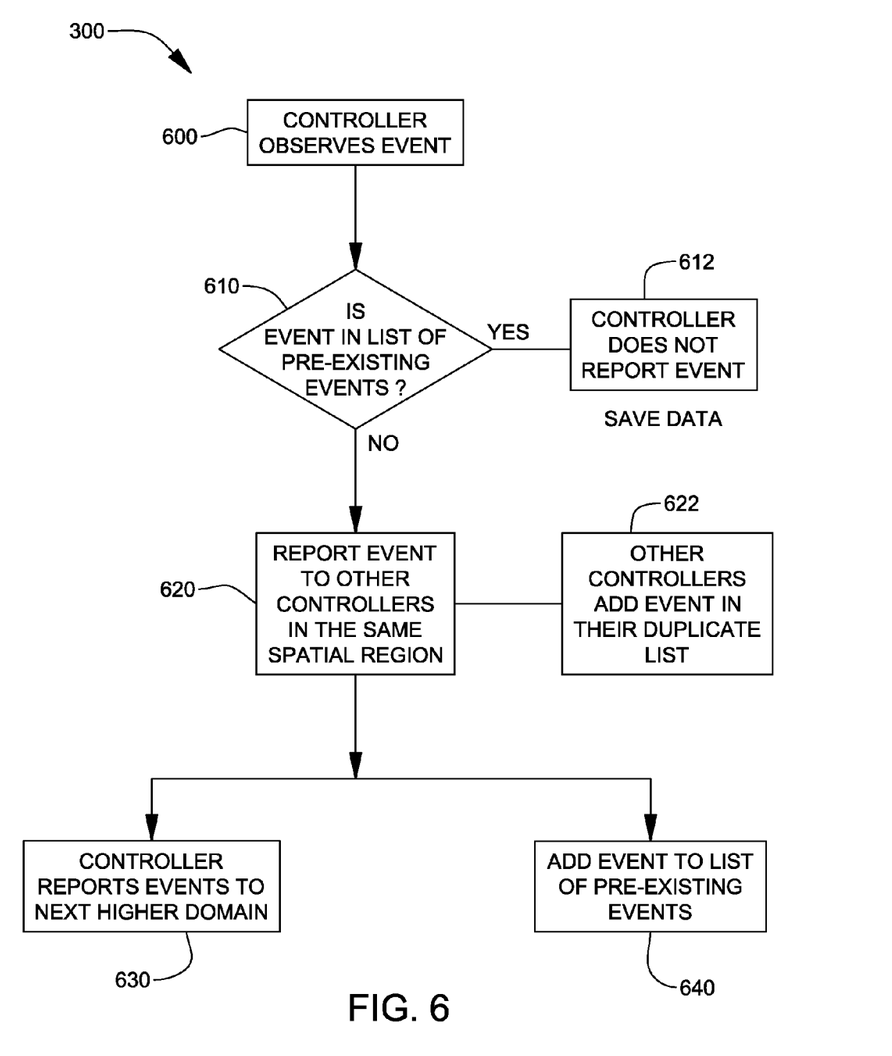
FIG. 6 is a simplified flow chart of the steps of peer-to-peer communication that filters multiple readings of a single event by controllers within the same spatial region in accordance with an embodiment of the invention. It is suggested that FIG. 6 be printed on the face of the patent.

FIG. 6 is a simplified flow chart of the process steps of the filtering module 300 of the preferred embodiment of a method, a program product, a system, and a service for peer-to-peer communication and processing amongst the controllers 100. In step 600, a reader/sensor or a reader/sensor/controller observes an event in its spatial region. The reader/sensor will communicate the event to the controller. In step 610, the reader/sensor/controller or controller determines if the observed event is already in its list of pre-existing events. Such a list of pre-existing events should be stored in a local nonvolatile memory, preferably within or very near to the processing unit of the controller. If, in stop 610, the observed event is in its list of preexisting events, the controller does not report the event to the next level of information processing as in step 612. In an alternative embodiment, even though the event is not reported, the information obtained by observation of the event may be stored in the local memory of the peer controller for later use. If the event has not been observed nor reported by any other peer controller as determined in step 610, then in step 620, the controller reports the event to all other peer controllers in the same spatial region. Again, this may be accomplished by direct communication or by reporting the event as a particular topic to which other peer controllers subscribe. At step 622, all the other peer controllers receiving notice of the event store the event in their respective list of pre-existing event. Then in step 630, the first controller witnessing the event reports the event to the next higher domain of information processing, e.g., the premises domain server 340. In step 640, the witnessing controller adds the event to its list of preexisting events, just in case it observes it again.

The peer-to-peer communication and processing amongst the controllers 100 eliminates the reporting of repeated events when the events are detected at separate times. A brief duration would be required after the first event for the event to propagate to the peer controllers within the same spatial region and to be added to their lists of preexisting events. If multiple events are detected simultaneously or close to the same time by the peer controllers, a simple instantiation of the peer-to-peer communication and processing amongst the controllers 100 as described herein does not prevent repeated events from being reported to the next higher domain. It will be appreciated, however, that variations of some elements are possible to adapt the invention for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

What is claimed is:

1. A method of establishing peer controllers in a spatial region of a sensor network, the method comprising the steps of:
   a computer recording an assignment of the spatial region to a plurality of electronic controllers;
   the computer recording which individual ones of the plurality of electronic controllers in the spatial region are coupled to a respective one of a plurality of reader/sensors in the spatial region;
   the computer transmitting an address of each of the plurality of electronic controllers to every other of the plurality of controllers in the spatial region; and
   initializing communication among the plurality of electronic controllers in the spatial region thereby establishing peer controllers;
   one of the plurality of reader/sensors observing an event in the spatial region;
   the observant reader/sensor transmitting tag data and data of the event to its respective peer controller;
   the respective peer controller determining that the event is in a list of preexisting events;
   the respective peer controller not reporting the event to a higher processing domain; and the respective peer controller not reporting the event to any other controller.

2. The method of claim 1, wherein the step of initializing communication among the plurality of peer controllers further comprises establishing a direct bidirectional peer-to-peer connection between all of the plurality of peer controllers in the spatial region.

3. The method of claim 1, wherein the step of initializing communication among the plurality of peer controllers further comprises:
   establishing communication through a broker application on the computer and each of the plurality of peer controllers subscribes to the broker application, and a subscription topic to which the plurality of peer controllers are subscribed comprises the addresses of the plurality of peer controllers in or a unique identifier of the spatial region.

4. The method of claim 1, further comprising reporting an event in the spatial region, wherein the steps of reporting an event further comprises:
   one of the plurality of reader/sensors recording an event in the spatial region;
   the observant reader/sensor transmitting tag data and data of the event to its respective peer controller;

the respective peer controller determining that the event is a new event;

the respective peer controller transmitting the tag data and the new event data to a higher processing domain;

the respective peer controller transmitting the new event data to all others of the plurality of peer controllers in the spatial region; and all others of the plurality of peer controllers in the spatial region storing the new event data in its list of preexisting events.

5. The method of claim 4, wherein each of the plurality of peer controllers in the spatial region stores the tag data and the new event data in its local memory.

6. The method of claim 4, wherein the list of preexisting events is a subscription topic through a broker application on a computer and each of the plurality of peer controllers subscribes to the broker application.

7. The method of claim 1, further comprising the respective peer controller storing the data of the event in its local memory.

8. The method of claim 1, wherein the list of preexisting events is a topic stored on a broker application to which the respective peer controller subscribes.

9. The method of claim 1, wherein the list of preexisting events is stored in a local memory on the respective peer controller.

10. A computer program product for establishing peer-to-peer communications between a plurality of electronic peer controllers, each electronic peer controller uniquely connected to a respective one of a plurality of reader/sensors in a tagged information network, the computer program product comprising a non-transitory computer usable storage medium having computer usable program code comprising:

first program instructions to assign a spatial region in the tagged information network to a plurality of electronic peer controllers, each of the peer controllers connected to a respective one of a plurality of reader/sensors that senses tagged information in the spatial region;

second program instructions to transmit identifying information of each peer controller in the spatial region to every other of the plurality of peer controllers in the spatial region;

third program instructions to initialize communication among the plurality of peer controllers;

ninth program instructions to determine that an observed event has been reported to a higher processing domain, further comprising:

tenth program instructions to receive tag data and event data from its respective reader/sensor of an event occurring in the spatial region:

eleventh program instructions to determine that the tag data or event data is stored in its list of preexisting events: and twelfth program instructions to not report the tag data or event data to a higher processing domain or to any other of the plurality of electronic peer controllers in the spatial region.

11. The computer program product of claim 10, wherein the computer usable program code executes in processing device in a higher processing domain than a domain of the plurality of peer controllers.

12. The computer program product of claim 10, further comprising:

fourth program instructions to instantiate each of the plurality of electronic peer controllers to receive tag data and event data from its respective reader/sensor of an event occurring in the spatial region;

fifth program instructions to determine that the event is a new event;

sixth program instructions to transmit the tag data and event data of the new event to a higher processing domain;

seventh program instructions to transmit at least the event data of the new event to all other of the plurality of peer controllers in the spatial region; and eighth program instructions to store the event data of the new event to a list of preexisting events in each of the plurality of peer controllers in the spatial region.

* * * * *